Figure 1:
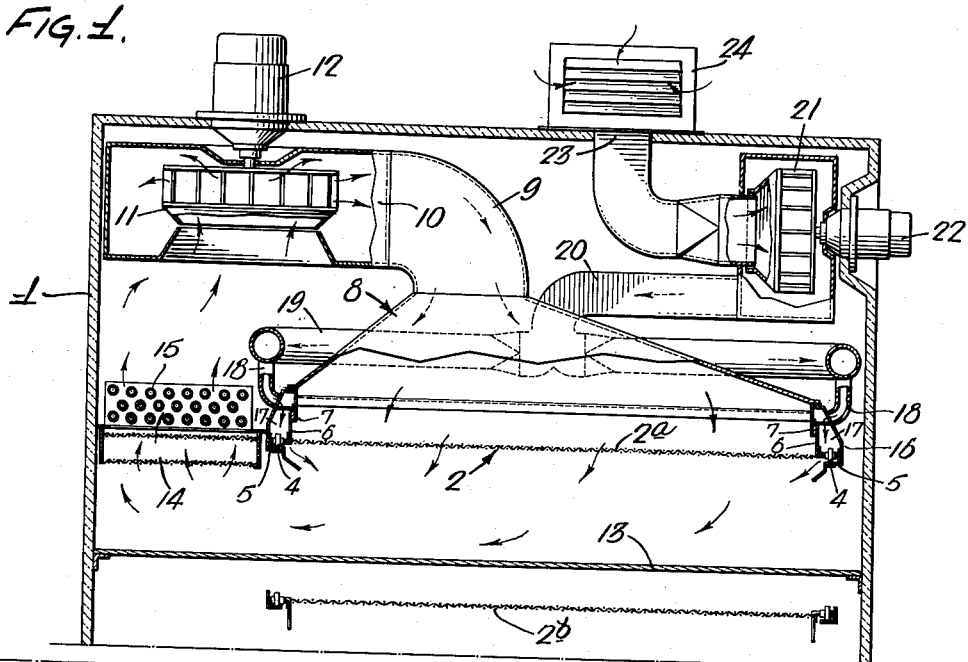

Jan. 31, 1956   H. G. BLACK   2,732,631
CONVEYOR DRYERS
Filed Sept. 20, 1954

Inventor:
Harold G. Black
by Howson & Howson
Attys.

United States Patent Office 2,732,631
Patented Jan. 31, 1956

2,732,631

CONVEYOR DRYERS

Harold G. Black, Glenside, Pa., assignor to Proctor and Schwartz, Inc., Philadelphia, Pa., a corporation of Pennsylvania Application September 20, 1954, Serial No. 456,986

4 Claims. (Cl. 34—219)

This invention relates to new and useful improvements in conveyor dryers and is especially adapted to conveyor dryers for drying loose fibrous, granular and like materials.

In conveyor type dryers the material to be dried is transported by a conveyor through a dryer chamber and the material is dried by causing the drying air to be passed vertically through the material on the conveyor as the latter moves through the drying chamber. In the case of loose fibrous and granular and like materials there has always existed the problem of maintaining the side chains of the conveyor clean and preventing the collection thereon of particles of dust and materials. Collection of dust and particles of the materials being dried upon the conveyor side chains greatly increases the cost of chain maintenance and requires periodic shut-downs for cleaning purposes thereby causing loss of production. Also the collection of material in and upon the conveyor side chains increases the danger of fire from friction and in many cases results in contamination of the product being dried, etc.

Many attempts have been made in the past to overcome this difficulty. These attempts for the most part have consisted in various arrangements of side guards at opposite sides of the conveyor designed to retain the material being dried entirely on the conveyor and prevent any displacement or discharge of the particles of material laterally from the conveyor screen onto the side chains of the conveyor. While the use of such side guards has been beneficial to varying degrees, they have not afforded a satisfactory solution to the problem particularly in the drying of loose fibrous or granular and like materials.

With the foregoing in mind the principal object of the present invention is to provide an improved conveyor type dryer construction in which the collection of dust and particles of the material upon the conveyor side chains is substantially eliminated and the side chains are maintained continuously in a clean state or condition.

Another object of the invention is to provide an improved conveyor type dryer construction as set forth which is of relatively simplified construction and substantially inexpensive to manufacture and maintain in operation.

More particularly it is an object of the present invention to accomplish the foregoing results by providing a conveyor type dryer construction in which the conveyor side chains travel in a chamber to which clean or filtered air is introduced and caused to flow continuously over and through conveyor side chains as the latter move longitudinally through the dryer. The air is introduced into the side chain chambers at a pressure equal to or greater than the pressure of the circulating drying air and is discharged over and through the conveyor side chains to remove any dust or particles of material deposited on the chains and thereby continuously maintain the latter in a clean state of condition. Furthermore, since the air is introduced into the side chain chambers at a pressure at least as great as the circulating drying air, the entrance of dust and particles of the material into the pressurized chain chambers from the drying zone of the conveyor is substantially precluded.

Figure 2:
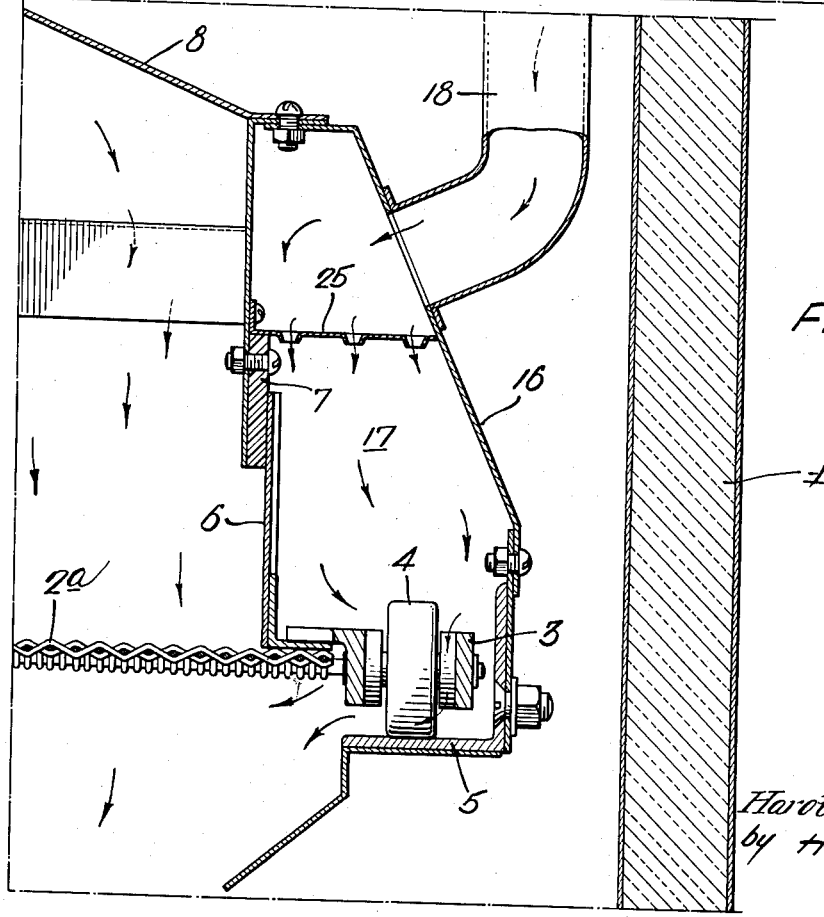

These and other objects of the invention and the various features and details of the construction and operation thereof are hereinafter set forth and described with reference to the accompanying drawing in which:

Fig. 1 is a vertical sectional view transversely through one section of a conventional conveyor type dryer, and Fig. 2 is an enlarged fragmentary sectional view showing the details of construction and arrangement of the pressurized side chain chamber at one side of the conveyor.

Referring now to the drawings there is shown a typical dryer construction comprising a housing or enclosure 1 in which is mounted an endless conveyor 2 arranged to provide upper and lower horizontal courses 2a and 2b extending longitudinally through the dryer housing 1. The body of the conveyor preferably is of the foraminous type composed of wire mesh screen or perforated plates attached along its opposite edges to side chains 3 in conventional manner. The side chains 3 are provided with the customary roller supports 4 which ride on supporting tracks 5 that are fixedly mounted in the drying chamber.

Each of the opposite longitudinal edges of the conveyor 2 is provided with a substantially vertical side guard 6 which is disposed inwardly of the side chains 3. These side guards 6 may be of sectional construction having the ends of the sections disposed in overlapping relation to each other at the pintles of the side chains of the conveyor and the coinciding pivotal connections between the sections of the body portion of the conveyor, for example as shown and described in United States Patent No. 2,019,383, issued October 29, 1935. The upper edge portion of the side guard 6 at each side of the conveyor 2 is arranged in overlapping contacting relation to the outer surface of a stationary guard 7 which is fixedly secured in place by attachment to a stationary structural part of the dryer. The construction and arrangement of the cooperating side guards 6 and 7 is such as to tend to maintain a sliding sealing contact between them at all times during longitudinal movement of the conveyor 2 through the dryer housing 1.

In accordance with conventional practice the interior of the dryer is subdivided longitudinally into a succession of substantially identical sections or compartments in each of which there is mounted in overlying relation to the upper course 2a of the conveyor 2 a hood structure 8. The hood structure 8 is divergent downwardly from an inlet opening 9 for air at the top to the lower end of the hood which extends longitudinally the full length of the section and has a width transversely of the dryer substantially coextensive with the width of the underlying conveyor between the cooperating side guards 6 and 7 at respectively opposite sides thereof. Overlying the hood 8 in each section of the dryer and communicating with the air inlet opening 9 thereto is an air chamber 10 into which air is discharged laterally from a fan or blower 11 driven by suitable motor 12 mounted on the top of the dryer housing 1. A horizontal partition 13 is mounted between the upper and lower courses of the conveyor 2 and the drying air discharged by the fan or blower 11 passes downwardly through material on the upper course of the conveyor 2 and into the space below the conveyor upper course 2a whence it passes through suitable filters 14 and heating element 15 by means of which the air is filtered and reheated preparatory to being recirculated by the fan or blower 11.

According to the present invention and in order to prevent the loose fibrous stock and granular and like materials being dried from sifting outwardly through the cooperating side guard members 6 and 7 at opposite sides of the conveyor and at the same time keep the conveyor side chains 3 clean and free of collected fibres and dust, there is provided at opposite sides of the conveyor exteriorly of the cooperating side guard members 6 and 7, respectively, a wall structure 16 which defines, in cooperation with the said side guards, an air chamber 17 that substantially encloses the side chains 3 and their rollers 4. The wall structure 16 and air chamber 17 defined thereby extend the entire length of the upper course of the conveyor 2. The wall structure 16 is detachably mounted in place so that it may be readily removed and replaced for access to the conveyor side chains.

Air is discharged into the chambers 17 by means of branch pipes 18 which lead from the opposite ends of a transversely extending manifold pipe 19 that is supplied with air by a pipe 20 from the discharge of a fan or blower 21 driven by a suitable motor 22. This fan or blower 21 has its intake communicating directly with the exterior of the dryer housing 1 as shown at 23 and suitable filters 24 are provided to clear the intake air entering the blower 21.

The filtered air is discharged by the fan or blower 21 into the chambers 17 at a pressure equal to or greater than the pressure of the circulating drying air passing through the conveyor.

Extending longitudinally within each chamber 17 is a continuous horizontal baffle member 25 which is disposed intermediate the discharge outlet of the pipe 18 and the conveyor side chain 3. The baffle 25 is provided with uniformly spaced openings therein and functions to distribute and diffuse the air uniformly downwardly, as indicated by the arrows in Fig. 2, onto and through the conveyor side chains 3 thus keeping them free of dust and particles of the material which may become deposited thereon. After passing through and over the conveyor side chains 3 the air is discharged or escapes downwardly and inwardly into the main dryer chamber beneath the upper course of the conveyor where it becomes mixed with the circulating drying air discharged by the fan or blower 11 downwardly through the material on the conveyor.

Not only does the discharge of filtered air into the chambers 17 and over and through the conveyor side chains 3 maintain the latter clean and free of dust and materials which may collect thereon, but since the air discharged into the chambers 17 is at a pressure at least as great as the circulating drying air, any tendency for particles of the material on the conveyor to sift past the cooperating side guard members 6 and 7 is substantially eliminated.

The present invention substantially prevents dust or particles of fibres or granular and like materials being dried on the conveyor 2 from collecting in the side chain bearings and wrapping around the chain rollers 4 during passage of the conveyor 2 through the drying chamber. The elimination of this difficulty greatly reduces chain maintenance and loss of production due to periodic shut-downs for cleaning purposes. Furthermore, the danger of fire from friction is minimized and product cleanliness is greatly improved. This is an especially beneficial advantage when drying materials such as cotton linters which are abrasive and other similar materials where it is not practical to lubricate the conveyor side chains because of the possibility of the oil contaminating or soiling the product.

While a particular embodiment of the present invention has been illustrated and described in connection with a specific dryer construction, it is not intended that the invention shall be limited to the embodiment disclosed herein and it is contemplated that changes and modifications of the invention to meet the requirements of different dryer constructions may be made without departing from the scope of the invention as set forth in the following claims:

I claim:

1. In a dryer construction comprising a housing in which a drying medium is circulated vertically through material upon a foraminous endless conveyor having laterally spaced side chains supported for horizontal movement longitudinally through the dryer and provided with vertical side guards disposed inwardly adjacent said side chains and cooperating with fixed side guards in said housing to retain the material on the conveyor, a structure at each side of the conveyor providing in cooperation with said side guards a chamber extending longitudinally of and enclosing the side chains, and means to discharge air under pressure into said chambers and over and through the side chains therein to maintain the said side chains clean and free of particles of the material and dust.

2. In a dryer construction comprising a housing in which a drying medium is circulated vertically through material upon a foraminous endless conveyor having laterally spaced side chains supported for horizontal movement longitudinally through the dryer and provided with vertical side guards disposed inwardly adjacent said side chains and cooperating with fixed side guards in said housing to retain the material on the conveyor, a structure at each side of the conveyor providing cooperation with said side guards, a chamber extending longitudinally of and enclosing the side chains, and means to introduce into said chambers filtered air at a pressure at least as great as the pressure of the circulating drying medium to thereby prevent the ingress to said chambers of particles of the material and dust.

3. In a dryer construction comprising a housing in which a drying medium is circulated vertically through material upon a foraminous endless conveyor having laterally spaced side chains supported for horizontal movement longitudinally through the dryer and provided with vertical side guards disposed inwardly adjacent said side chains and cooperating with fixed side guards in said housing to retain the material on the conveyor, a structure at each side of the conveyor providing in cooperation with said side guards a chamber extending longitudinally of and enclosing the side chains, means to introduce into said chambers filtered air at a pressure at least as great as the pressure of the circulating drying medium to thereby prevent the ingress to said chambers of particles of the material and dust, and a perforate baffle partition in each chamber overlying the side chain and disposed intermediate the latter and the air inlet to the chamber to distribute and diffuse the air uniformly over and through the side chain throughout the length of the chamber to maintain said side chains clean and free of particles of the material and dust.

4. In a dryer construction comprising a housing in which a drying medium is circulated vertically through material upon a foraminous endless conveyor having laterally spaced side chains supported for horizontal movement longitudinally through the dryer and provided with vertical side guards disposed inwardly adjacent said side chains and cooperating with fixed side guards in said housing to retain the material on the conveyor, a structure at each side of the conveyor providing in cooperation with said side guards a chamber extending longitudinally of and enclosing the side chains, means to introduce into said chambers filtered air at a pressure at least as great as the pressure of the circulating drying medium to thereby prevent the ingress to said chambers of particles of the material and dust, and a baffle partition in each chamber overlying the side chain and disposed intermediate the latter and the air inlet to the chamber, said baffle having uniformly spaced openings for the passage of air therethrough and operable to distribute and diffuse the air uniformly over and through the side chain throughout the length of the chamber to maintain the latter clean at all times.

References Cited in the file of this patent

UNITED STATES PATENTS

| | | |
|---|---|---|
| 2,304,692 | Hurxthal et al. | Dec. 8, 1942 |
| 2,336,698 | Morrill | Dec. 14, 1943 |